(12) United States Patent
Yin et al.

(10) Patent No.: US 9,806,825 B2
(45) Date of Patent: Oct. 31, 2017

(54) NOISE CANCELLATION SYSTEM

(71) Applicant: Futurewei Technologies, Inc., Plano, TX (US)

(72) Inventors: Ping Yin, Greensboro, NC (US); Robert Irvine, Greensboro, NC (US); Seong-Mo Yim, Oak Ridge, NC (US); Yusong Chi, Shanghai (CN); Chengfang Liao, Shanghai (CN); Feng Wang, Jamestown, NC (US); Eric Sung, Greensboro, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/131,762

(22) Filed: Apr. 18, 2016

(65) Prior Publication Data

US 2016/0233968 A1 Aug. 11, 2016

Related U.S. Application Data

(62) Division of application No. 13/861,206, filed on Apr. 11, 2013, now Pat. No. 9,319,084.
(Continued)

(51) Int. Cl.
*H04B 1/10* (2006.01)
*H04B 15/00* (2006.01)
(Continued)

(52) U.S. Cl.
CPC ............... *H04B 15/00* (2013.01); *H04B 1/30* (2013.01); *H04B 1/38* (2013.01)

(58) Field of Classification Search
CPC ............... H04B 1/06; H04B 1/10; H04B 1/30
See application file for complete search history.

(56) References Cited

U.S. PATENT DOCUMENTS

| 6,433,524 B1 * | 8/2002 | Yang | G01R 17/105 323/274 |
|---|---|---|---|
| 7,043,222 B2 | 5/2006 | Wortel et al. | |

(Continued)

OTHER PUBLICATIONS

Chinese Search Report of Patent Cooperation Treaty (PCT), Application No. PCT/CN2014/073331, Applicant Huawei Technologies Co., Ltd., date of mailing Jun. 19, 2014, 12 pages.
(Continued)

*Primary Examiner* — Wesley Kim
*Assistant Examiner* — Dong-Chang Shiue
(74) *Attorney, Agent, or Firm* — Slater Matsil, LLP

(57) ABSTRACT

A noise cancellation system comprises an I-channel mixer configured to receive a radio frequency signal from an antenna and an intermediate frequency signal from a local oscillator, a Q-channel mixer configured to receive the radio frequency signal from the antenna and a phase-shifted intermediate frequency signal from the local oscillator, a first noise cancellation apparatus connected with the I-channel mixer, wherein an I-channel differential mode second-order intermodulation component and an I-channel common mode second-order intermodulation component cancel each other in the first noise cancellation apparatus and a second noise cancellation apparatus connected with the Q-channel mixer, wherein a Q-channel differential mode second-order intermodulation component and a Q-channel common mode second-order intermodulation component cancel each other in the second noise cancellation apparatus.

20 Claims, 3 Drawing Sheets

Related U.S. Application Data

(60) Provisional application No. 61/780,416, filed on Mar. 13, 2013.

(51) Int. Cl.
  *H04B 1/30* (2006.01)
  *H04B 1/38* (2015.01)

(56) References Cited

U.S. PATENT DOCUMENTS

| | | | |
|---|---|---|---|
| 7,929,938 | B2 | 4/2011 | Sellars et al. |
| 2007/0049215 | A1* | 3/2007 | Chen .................... H03D 7/1441 455/86 |
| 2008/0280584 | A1* | 11/2008 | Ko ........................ H03D 7/1441 455/333 |
| 2009/0088122 | A1 | 4/2009 | Xu et al. |
| 2009/0195303 | A1 | 8/2009 | Bowhers |
| 2009/0203347 | A1 | 8/2009 | Kaczman et al. |
| 2009/0325529 | A1 | 12/2009 | Yang et al. |
| 2014/0204986 | A1* | 7/2014 | Suissa ................. H04L 27/0014 375/219 |

OTHER PUBLICATIONS

Hwang et al., "A High IIP2 Direct-Conversion Receiver Using Even-Harmonic Reduction Technique for Cellular CDMA/PCS/GPS Application," IEEE Transactions on Circuits and Systems—I: Regular Paper, vol. 55, No. 9, Oct. 2008, 10 pages.

Kim et al., "A Direct Conversion Receiver With an IP2 Calibrator for CDMA/PCS/GPS/AMPS Applications," IEEE Journal of Solid-State Circuits, , vol. 41, No. 7, Jul. 2006, 7 pages.

Vahidfar et al., "A High IIP2 Mixer Enhanced by a New Calibration Technique for Zero-IF Receiver," IEEE Transactions on Circuits and Systems—II: Express Briefs, vol. 55, No. 3, Mar. 2008, 5 pages.

\* cited by examiner

NOISE CANCELLATION SYSTEM

This application is a divisional of U.S. patent application Ser. No. 13/861,206, filed on Apr. 11, 2013, entitled "Noise Cancellation Apparatus and Method," and claims the benefit of U.S. Provisional Application Ser. No. 61/780,416 filed on Mar. 13, 2013, and entitled "Noise Cancellation Apparatus and Method," which application is incorporated herein by reference.

TECHNICAL FIELD

The present invention relates to a noise cancellation apparatus, and more particularly, to a noise cancellation apparatus for attenuating the second-order intermodulation components of a direct-conversion receiver in a mobile handset.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of standards such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE).

A wireless network may include a wireless device and a plurality of base stations. The wireless device may be a notebook computer, a mobile phone or a Personal Digital Assistant (PDA), a media player, a gaming device or the like. The base stations communicate with the wireless device over a plurality of wireless channels coupled between the wireless device and the base stations (e.g., a downlink channel from a base station to a wireless device). The wireless device may send back information, including channel information, to the base stations over a plurality of feedback channels (e.g., an uplink channel from the wireless device to the base station).

The wireless device may include a processor, a transmitter and a receiver. The transmitter may be coupled to one transmit antenna. The receiver may be coupled to a receive antenna. One major function of the receiver is rejecting unwanted noise such as adjacent channels and interference so that a desired signal from a wide spectrum of signals from the receive antenna can be recovered.

As wireless techniques further advance, direct-conversion receivers have emerged as an alternative and have been widely used in mobile phones. One advantageous feature of direct-conversion receivers is that the direct conversion receivers may not comprise bulky components such as intermediate frequency surface acoustic wave filters, intermediate frequency synthesizers and/or the like.

One disadvantageous feature of the direct conversion receivers is that even-order distortion such as the second-order intermodulation (IM2) may occur in the direct-conversion receiver. Especially, the down-conversion mixer of a direct-conversion receiver is a major source of the IM2 components. The IM2 components may comprise two parts, namely a differential mode IM2 component and a common mode IM2 component. Both the differential mode IM2 component and the common mode IM2 component are unwanted signals for mobile handsets and may cause interference and lead to deterioration in receiver performance.

SUMMARY OF THE INVENTION

These and other problems are generally solved or circumvented, and technical advantages are generally achieved, by preferred embodiments of the present invention which provide a system, apparatus and method for reducing the second-order inter-modulation (IM2) noise.

In accordance with an embodiment, a system comprises a mixer coupled to an antenna through a gain stage and a filter stage of a receiver, a trans-impedance amplifier stage coupled to an output of the mixer, a noise reduction stage coupled to the trans-impedance amplifier stage, wherein the noise reduction stage comprises a first adjustable resistor and a second adjustable resistor connected in series with the first adjustable resistor, wherein the first adjustable resistor and the second adjustable resistor are configured such that the first adjustable resistor has a first resistance variation and the second adjustable resistor has a second resistance variation equal to the first resistance variation in an opposite direction and the first resistance variation is so selected that differential mode second-order noise and common mode second-order noise cancel each other and a feedback loop stage coupled to the noise reduction stage.

In accordance with another embodiment, a system comprises an I-channel mixer configured to receive a radio frequency signal from an antenna and an intermediate frequency signal from a local oscillator, a Q-channel mixer configured to receive the radio frequency signal from the antenna and a phase-shifted intermediate frequency signal from the local oscillator, a first noise cancellation apparatus connected with the I-channel mixer, wherein an I-channel differential mode second-order intermodulation component and an I-channel common mode second-order intermodulation component cancel each other in the first noise cancellation apparatus and a second noise cancellation apparatus connected with the Q-channel mixer, wherein a Q-channel differential mode second-order intermodulation component and a Q-channel common mode second-order intermodulation component cancel each other in the second noise cancellation apparatus.

In accordance with yet another embodiment, a system comprises a trans-impedance amplifier stage coupled to an output of a mixer, a second-order intermodulation (IM2) correction unit coupled to the trans-impedance amplifier stage, wherein the IM2 correction unit comprises a first variable resistor and a second variable resistor connected in series and coupled to the output of the mixer through a trans-impedance amplifier, and wherein a common node of the first variable resistor and the second variable resistor is regulated to a reference voltage level through a buffer coupled between the common node and a reference voltage and a feedback loop stage coupled to the IM2 correction unit.

An advantage of a preferred embodiment of the present invention is eliminating or reducing the IM2 noise of a direct-conversion receiver through a noise cancellation path formed by two adjustable resistors and a buffer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a second-order intermodulation (IM2) noise reduction apparatus for a mobile device. The invention may also be applied, however, to a variety of wireless systems. Hereinafter, various embodiments will be explained in detail with reference to the accompanying drawings.

Figure 1:
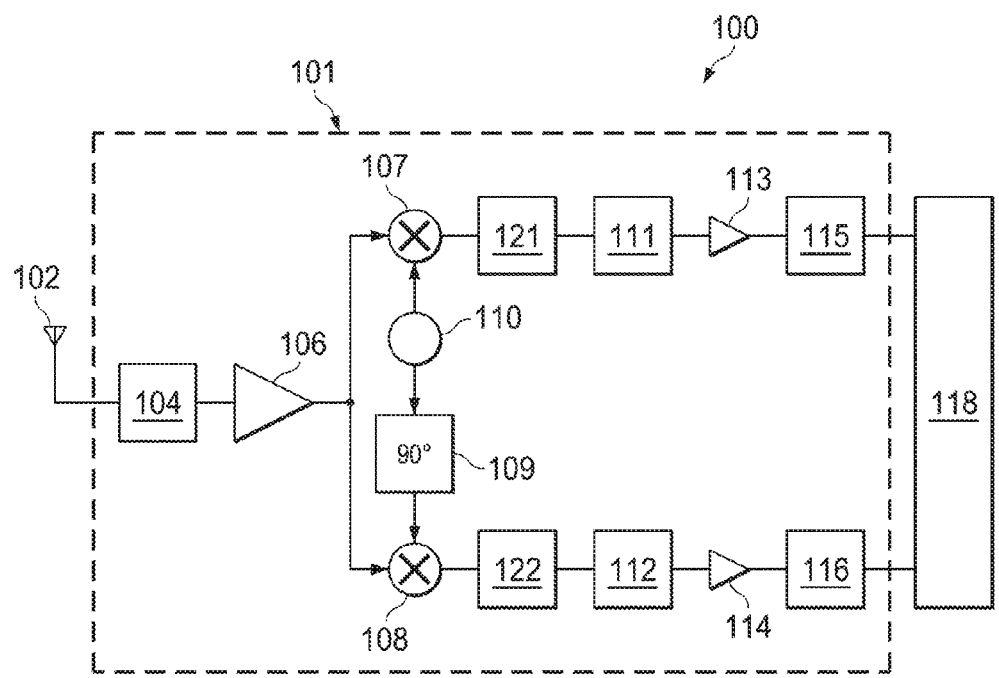
FIG. 1 illustrates a block diagram of a mobile device in accordance with various embodiments of the present disclosure.

FIG. 1 illustrates a block diagram of a mobile device in accordance with various embodiments of the present disclosure. The mobile device 100 may be a notebook computer, a mobile phone or a Personal Digital Assistant (PDA), a media player, a gaming device and/or the like. The mobile device 100 may comprise a receiver 101, a transmitter, antennas and other suitable components. For simplicity, only the detailed structure of the receiver 101 is shown in FIG. 1.

The receiver 101 is coupled between an antenna 102 and a baseband processor 118. While FIG. 1 shows a single antenna, the antenna 102 may include two antennas, namely a primary antenna and a secondary antenna. The primary antenna is configured to transmit outbound wireless signals from the mobile device to a base station or receive inbound wireless signals from the base station. The secondary antenna, as an auxiliary antenna, may not be able to transmit high performance outbound signals from the mobile device to the base station. The main function of the secondary antenna is receiving diversity wireless signals. A mobile device having two antennas is well known in the art, and hence is not discussed in further detail herein to avoid repetition.

The mobile device 100 may transmit and receive wireless signals modulated based upon various standards such as such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE). In addition, the wireless signals may be modulated based upon other standards such as Worldwide Interoperability for Microwave Access (WiMAX), Wireless Local Area Network (WLAN), Ultra Wideband (UWB) and/or the like.

The processor 118 may be any suitable baseband processors such as a digital signal processor (DSP) chip and/or the like. The processor 118 is employed to manage radio frequency functions and provide control software for radio communication. The processor 118 may be further coupled to other mobile device function units such as an application processor and/or the like.

As shown in FIG. 1, the receiver 101 may comprise a plurality of filters such as a first filter 104, an I-channel filter 111 and a Q-channel filter 112. The receiver 101 may further comprise a plurality of gain stages such as a low noise amplifier 106, an I-channel amplifier 113 and a Q-channel amplifier 114. In order to provide digital signals suitable for the processor 118, a plurality of analog-to-digital (A/D) converters 115 and 116 are employed as shown in FIG. 1. The functions of the filters, amplifiers and A/D converters described above are well known, and hence are not discussed in further detail herein.

A first mixer 107 is coupled to a local oscillator 110. The local oscillator 110 generates a signal at an intermediate frequency suitable for the processor 118. In some embodiments, the signal generated by the local oscillator 110 is of a 25% duty cycle. After being processed by the first mixer 107, an in-phase (I) signal having the intermediate frequency is generated and sent to the processor 118.

Likewise, a second mixer 108 is coupled to the local oscillator 110 through a phase shifter 109. The phase shifter 109 adds a 90 degree phase shift to the signal generated by the local oscillator 110. The second mixer 108 generates a quadrature (Q) signal for digital signal processing in the processor 118.

Throughout the description, the channel the in-phase signal passes through is alternatively referred to as an I-channel of the receiver 101. Likewise, the channel the quadrature signal passes through is alternatively referred to as a Q-channel of the receiver 101. As shown in FIG. 1, the I-channel and the Q-channel may be of a same configuration.

The I-channel may comprise an I-channel IM2 correction unit 121, which is coupled to the output of the first mixer 107. The I-channel IM2 correction unit 121 is employed to attenuate I-channel IM2 components. Throughout the description, the I-channel IM2 components are alternatively referred to as the I-channel IM2 noise. The I-channel IM2 noise may further comprise a differential mode IM2 component and a common mode IM2 component.

The Q-channel may comprise a Q-channel IM2 correction unit 122 coupled to the output of the second mixer 108. The Q-channel IM2 correction unit 122 is employed to attenuate Q-channel IM2 components. Throughout the description, the Q-channel IM2 components are alternatively referred to as the Q-channel IM2 noise. The Q-channel IM2 noise may further comprise a differential mode IM2 component and a common mode IM2 component.

It should be noted that FIG. 1 illustrates a simplified block diagram of the I-channel IM2 correction unit 121 and the Q-channel IM2 correction unit 122. A detailed schematic diagram of the IM2 correction units (e.g., the I-channel IM2 correction unit 121) will be described below with respect to FIGS. 2-4.

Figure 2:
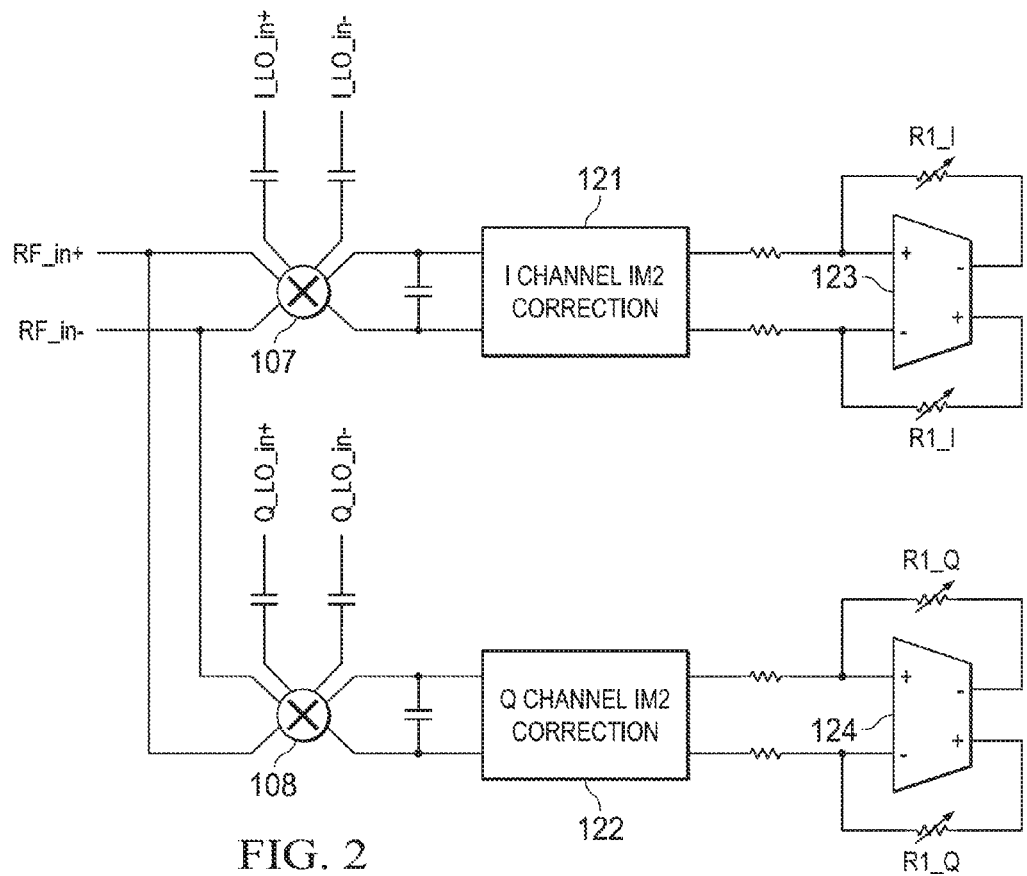
FIG. 2 illustrates a schematic diagram of the mixers and the IM2 correction units shown in FIG. 1 in accordance with various embodiments of the present disclosure.

FIG. 2 illustrates a schematic diagram of the mixers and the IM2 correction units shown in FIG. 1 in accordance with various embodiments of the present disclosure. As shown in FIG. 2, the first mixer 107 receives a radio frequency (RF) signal as well as an intermediate frequency signal from the local oscillator (shown in FIG. 1). The RF signal is multiplied by the intermediate frequency signal to generate an in-phase signal, which is sent to a first amplifier 123 through the I-channel IM2 correction unit 121. The I-channel IM2 correction unit 121 is employed to eliminate or at least reduce the I-channel IM2 noise.

The second mixer 108, the Q-channel IM2 correction unit 122 and the second amplifier 124 may form a Q-channel IM2 reduction mechanism, which is similar to that of the I-channel, and hence is not discussed herein to avoid repetition. Since the I-channel IM2 correction unit 121 and the Q-channel IM2 correction unit 122 may be of a similar structure, for brevity, the I-channel IM2 correction unit 121 is used to illustrate the operation principles of the IM2 correction units. The detailed structure of the I-channel IM2 correction unit 121 will be described below with respect to FIGS. 3-4. The detailed structure of the Q-channel IM2 correction unit 122 is shown in FIG. 5.

The first amplifier 123 and the second amplifier 124 are employed to provide further amplification of the desired signal (e.g., the baseband signal) from I-channel IM2 correction unit 121 and the Q-channel IM2 correction unit 122. Furthermore, the first amplifier 123 and the second amplifier 124 may provide a solution for resolving an I-channel/Q-channel (IQ) amplitude mismatch issue. The adjustable resistors R1_I and R1_Q may be used to compensate the IQ amplitude mismatch caused by the IM2 correction units. The detailed operation principle of the IQ amplitude mismatch compensation mechanism will be described below with respect to FIG. 4.

Figure 3:
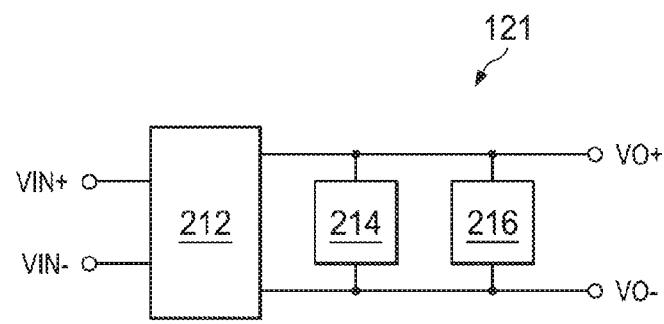
FIG. 3 illustrates a simplified block diagram of the IM2 correction unit shown in FIG. 2 in accordance with various embodiments of the present disclosure.

FIG. 3 illustrates a simplified block diagram of the I-channel IM2 correction unit shown in FIG. 2 in accordance with various embodiments of the present disclosure. The I-channel IM2 correction unit 121 may comprise three stages, namely a trans-impedance amplifier stage 212, a second-order noise reduction stage 214 and a common mode feedback loop stage 216. As shown in FIG. 3, these three stages are connected in cascade. More particularly, the second-order noise reduction stage 214 and the common mode feedback loop stage 216 are connected in parallel and further coupled to the output of the trans-impedance amplifier stage 212.

One advantageous feature of having the second-order noise reduction stage 214 connected in parallel with the common mode feedback loop stage 216 is that the dc gain of the receiver does not change. In other words, the second-order noise reduction stage 214 does not have an impact on the dc offset of the receiver. Reducing the I-channel IM2 noise without affecting the dc offset helps to simplify the design of the receiver.

In some embodiments, the trans-impedance amplifier stage 212 may be implemented as a common-gate trans-impedance amplifier, which will be described below with respect to FIG. 4. The common mode feedback loop stage 216 is designed to stabilize the output voltage of the trans-impedance amplifier. The second-order noise reduction stage 214 provides a path, wherein the differential mode and the common mode of the I-channel IM2 noise may cancel each other. As a result, the I-channel IM2 noise does not exist at the output of the I-channel IM2 correction unit 121. The detailed circuit diagram of the second-order noise reduction stage 214 will be described below with respect to FIG. 4.

Figure 4:
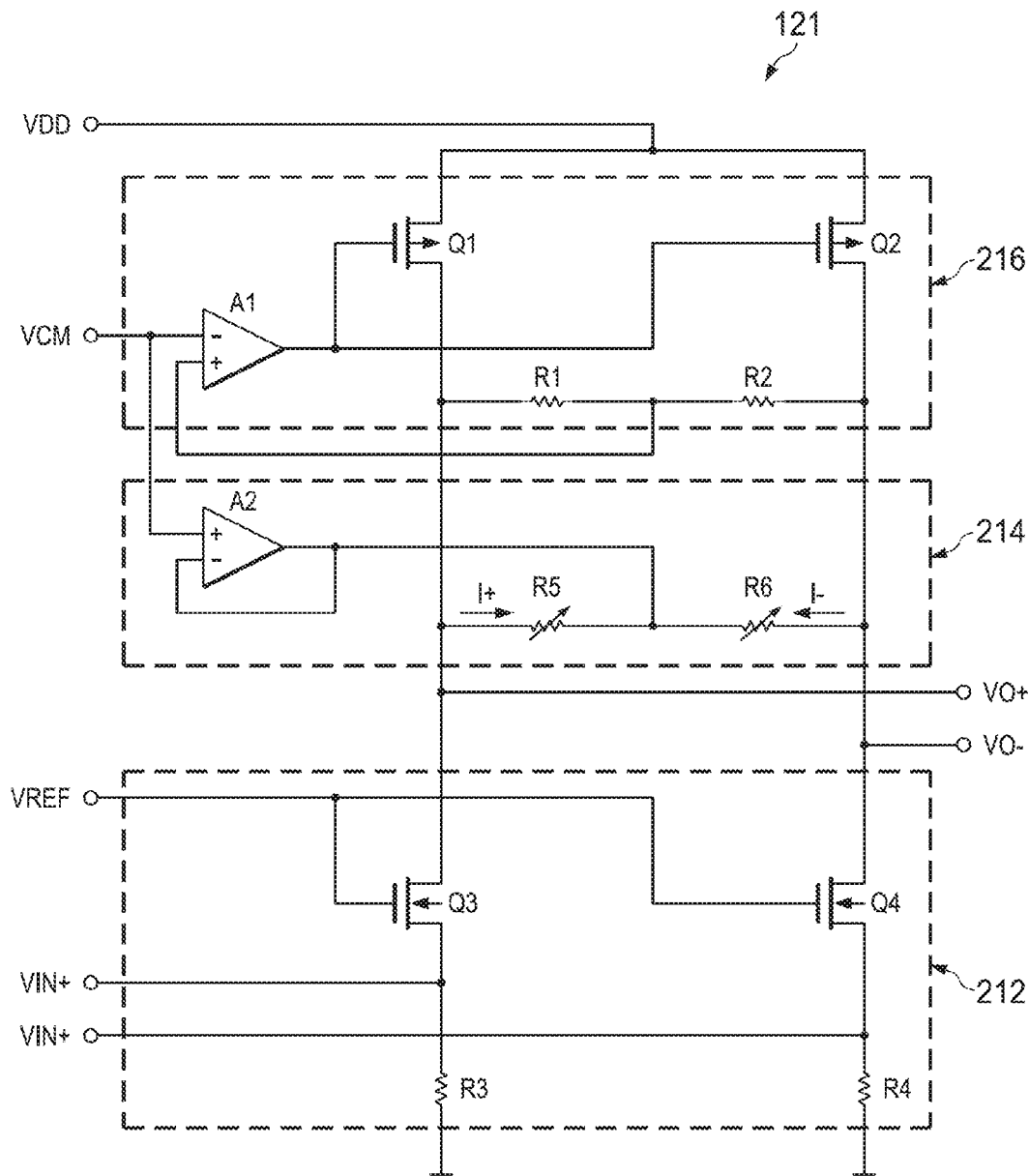
FIG. 4 illustrates a schematic diagram of the transimpedance amplifier stage, the second-order noise reduction stage and the common mode feedback loop stage shown in FIG. 3 in accordance with various embodiments of the present disclosure.
Figure 5:
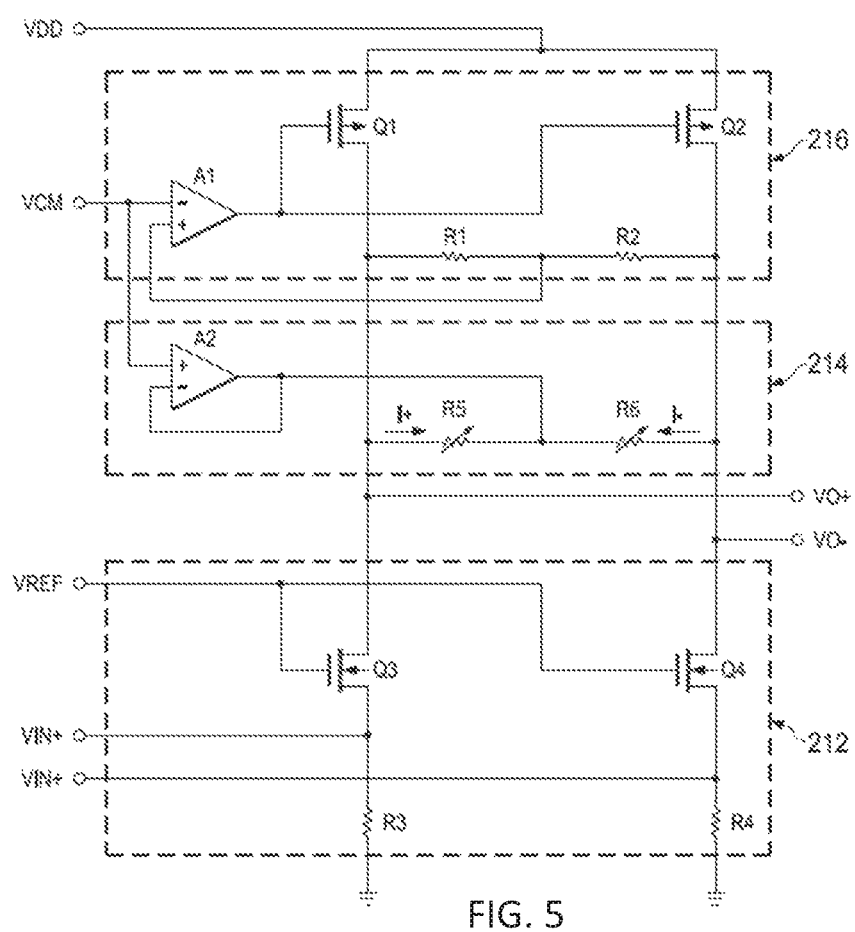
FIG. 5 illustrates a schematic diagram of the transimpedance amplifier stage, the second-order noise reduction stage and the common mode feedback loop stage of the Q-channel IM2 correction unit in accordance with various embodiments of the present disclosure.

FIG. 4 illustrates a schematic diagram of the trans-impedance amplifier stage, the second-order noise reduction stage and the common mode feedback loop stage shown in FIG. 3 in accordance with various embodiments of the present disclosure. The trans-impedance amplifier stage 212 includes transistors Q3 and Q4, and resistors R3 and R4. As shown in FIG. 4, the transistors Q3 and Q4 form a common gate circuit, which is well known in the art, and hence is not discussed in detail for brevity.

The common mode feedback loop stage 216 includes a first transistor Q1, a second transistor Q2, a first resistor R1, a second resistor R2 and a first amplifier A1. As shown in FIGS. 4, R1 and R2 form a divider circuit through which the output voltages VO+ and VO− are detected and sent back to a non-inverting input terminal of the first amplifier A1. The inverting input terminal of the first amplifier A1 is coupled to a common mode reference voltage VCM. By controlling the magnitude of the common mode reference voltage VCM, the output voltage VO+ and VO− may be set to a desired value through adjusting the gate voltages of the transistors Q1 and Q2. In other words, the common mode feedback loop stage 216 is used to adjust the dc output of the trans-impedance amplifier stage 212.

The second-order noise reduction stage 214 comprises a second amplifier A2, a fifth resistor R5 and a sixth resistor R6. As shown in FIG. 4, the configuration of the second amplifier A2 shows the second amplifier A2 may function as a buffer. Such a buffer provides a low impedance output. In addition, the buffer may be a unity-gain buffer. In other words, the output of the second amplifier A2 is approximately equal to the input of the second amplifier A2. As shown in FIG. 4, the input of the second amplifier A2 is coupled to the common mode reference voltage VCM. Therefore, the output of the second amplifier A2 is set to a voltage level approximately equal to VCM.

It should be noted that the second amplifier A2 and the resistors R5 and R6 are employed to adjust the ac output of the trans-impedance amplifier stage 212. In some embodiments, there may be no dc current flowing through the second-order noise reduction stage 214 including the resistors R5 and R6 connected in series.

As shown in FIG. 4, the input of the second amplifier A2 is coupled to the common mode reference voltage VCM.

The output of the second amplifier A2 is coupled to a common node of the resistors R5 and R6. The resistors R5 and R6 are adjustable resistors as indicated by the arrows in FIG. 4. While FIG. 4 shows two adjustable resistors, this configuration is merely an example. A person skilled in the art will recognize that there may be many alternatives, variations and modifications. For example, each adjustable resistor (e.g., resistor R5) may be formed by a fixed resistance portion and an adjustable resistance portion. The fixed resistance portions of R5 and R6 may be equal. The adjustable resistance portions may vary in response to two control signals (not shown) so that the total second-order noise components may flow into the adjustable resistors and cancel each other.

In accordance with some embodiments, the resistors R5 and R6 may be of a resistance value in a range from about 2K Ohm to about 32K Ohm. The ratio of the fixed resistance portion to the adjustable resistance portion may vary depending on different applications and design needs such as the noise correction range of the second-order noise reduction stage 214.

In some embodiments, in response to a control command, the resistances of R5 and R6 may vary. The variations of R5 and R6 may be equal, but they have opposite directions. The resistors R5 and R6 may be expressed as:

$$R5 = R + \tfrac{1}{2}\Delta R \quad (1)$$

$$R6 = R - \tfrac{1}{2}\Delta R \quad (2)$$

where R is the fixed portion of the resistors R5 and R6, and $\Delta R$ is the variable portion of the resistors R5 and R6.

The current flowing through the fifth resistor R5 is denoted as $I_+$. Likewise, the current flowing through the sixth resistor R6 is denoted as $I_-$. The common mode current $I_{CM}$ and the differential mode current $I_{DM}$ can be given by the following equations:

$$I_{CM} = \tfrac{1}{2}(I_+ + I_-) \quad (3)$$

$$I_{DM} = (I_+ - I_-) \quad (4)$$

The output voltage is the difference between VO+ and VO−. As such, the output voltage can be given by:

$$V_O = R5 \cdot I_+ - R6 \cdot I_- = (R + \tfrac{1}{2}\Delta R) \cdot I_+ - (R - \tfrac{1}{2}\Delta R) \cdot I_- \quad (5)$$

Equation (5) can be simplified through substitution. In other words, I+ and I− can be replaced by the common mode current $I_{CM}$ and the differential mode current $I_{DM}$. The output voltage can be simplified as:

$$V_O = I_{DM} \cdot R + I_{CM} \cdot \Delta R \quad (6)$$

In the case where the mixer is contaminated with the IM2 noise, the differential mode current $I_{DM}$ may comprise a desired signal as well as high order differential noise. On the other hand, the common mode current $I_{CM}$ may comprise high order common mode noise. The common mode current $I_{CM}$ and the differential mode current $I_{DM}$ may be given by the following equations:

$$I_{DM} = I_{SIG} + I_{IM2\_DM} + \quad (7)$$

$$I_{CM} = I_{IM2\_CM} + \quad (8)$$

where $I_{SIG}$ is the desired signal, $I_{IM2\_DM}$ is the differential mode second-order noise, and $I_{IM2\_CM}$ is the common mode second-order noise.

The output voltage can be expressed as the following by replacing the common mode current $I_{CM}$ and the differential mode current $I_{DM}$ in equation (6) with those shown in equations (7) and (8) respectively.

$$V_O = I_{SIG} \cdot R + I_{IM2\_DM} \cdot R + I_{IM2\_CM} \cdot \Delta R + \quad (9)$$

The I-channel IM2 noise can be cancelled by choosing the variable resistance portions of R5 and R6 if the following condition is satisfied:

$$I_{IM2\_DM} \cdot R + I_{IM2\_CM} \cdot \Delta R = 0 \quad (10)$$

As shown by equation (10) above, the I-channel IM2 noise may be cancelled if the adjustable resistors are selected based upon the relationship shown in equation (10). When the bandwidth of the common mode feedback control stage is relatively small, the second-order noise reduction stage 214 may effectively reduce the I-channel IM2 noise while having a minimum impact on the dc offset of the receiver.

In addition, the common mode feedback loop stage 216 may help to suppress the I-channel IM2 noise within its bandwidth. Therefore, the second-order noise reduction stage 214 is so designed to reduce the I-channel IM2 noise beyond the bandwidth of the common mode feedback loop stage 216. In other words, the bandwidth of the common mode feedback loop stage 216 should be smaller than the bandwidth of the second-order noise reduction stage 214 of the receiver.

It should be noted while FIG. 4 shows a second-order noise reduction stage employed in the I-channel of the receiver, the second-order noise reduction stage may be applied to both the I-channel and the Q-channel of the receiver. More particularly, the second-order noise reduction stage of the I-channel is independent from the second-order noise reduction stage of the Q-channel. After detecting IM2 noise at either the I-channel or the Q-channel, a controller (not shown) may change the adjustable portion of the second-order noise reduction stage (e.g., resistors R5 and R6) until the adjustable portion can satisfy the condition shown in equation (10). As a result, both the I-channel and the Q-channel are free from IM2 noise. The second-order noise reduction stage helps to improve the receiver's performance characteristics such as the signal-to-noise ratio (SNR) and/or the like.

It should further be note that there may be an imbalance between the amplitude of the I-channel signal and the amplitude of the Q-channel signal after the second-order noise reduction mechanism is applied to the I-channel and Q-channel independently. Such an amplitude imbalance may be compensated at a subsequent stage (not shown but illustrated in FIG. 2) coupled to the outputs of the IM2 correction units.

Referring back to FIG. 2, the amplifiers 123 and 124 are coupled to the outputs of the I-channel IM2 correction unit 121 and the Q-channel IM2 correction unit 122 respectively. The adjustable resistors R1_I and R1_Q are employed to adjust the amplitudes of the I-channel signals and Q-channel signals respectively. As a result, the amplitude mismatch can be compensated accordingly.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
an I-channel mixer configured to receive a radio frequency signal from an antenna and an intermediate frequency signal from a local oscillator;
a Q-channel mixer configured to receive the radio frequency signal from the antenna and a phase-shifted intermediate frequency signal from the local oscillator;
a first noise cancellation apparatus connected with the I-channel mixer, wherein the first noise cancellation apparatus includes:
two adjustable resistors connected in series between two output terminals of the first noise cancellation apparatus, wherein a common node of the two adjustable resistors is connected to an output of a buffer, and wherein an input of the buffer is connected to a reference voltage, and wherein an I-channel differential mode second-order intermodulation component and an I-channel common mode second-order intermodulation component cancel each other in the first noise cancellation apparatus based on adjustable settings of the two adjustable resistors; and
a second noise cancellation apparatus connected with the Q-channel mixer, wherein:
a Q-channel differential mode second-order intermodulation component and a Q-channel common mode second-order intermodulation component cancel each other in the second noise cancellation apparatus.

2. The system of claim 1, further comprising:
a first amplifier coupled to the first noise cancellation apparatus, wherein the first amplifier comprises a first adjustable resistor; and
a second amplifier coupled to the second noise cancellation apparatus, wherein the second amplifier comprises a second adjustable resistor, and wherein:
the first adjustable resistor and the second adjustable resistor are configured to adjust I-channel and Q-channel signal amplitudes in response to an amplitude mismatch.

3. The system of claim 1, wherein the first noise cancellation apparatus comprises:
a trans-impedance stage coupled to an output of the I-channel mixer;
a common mode feedback loop stage connected with the trans-impedance stage; and
a noise cancellation stage connected in parallel with the trans-impedance stage.

4. The system of claim 3, wherein:
the common mode feedback loop stage is configured to regulate an output voltage of the trans-impedance stage in response to the reference voltage.

5. The system of claim 4, wherein the noise cancellation stage comprises the two adjustable resistors including:
a first adjustable resistor;
a second adjustable resistor connected in series with the first adjustable resistor, and wherein:
the first adjustable resistor has a first resistance variation portion and the second adjustable resistor has a second resistance variation portion of a resistance value equal to that of the first resistance variation portion in an opposite direction; and
the I-channel differential mode second-order intermodulation component and the I-channel common mode second-order intermodulation component cancel each other based on adjustable settings of the first resistance variation portion and the second resistance variation portion.

6. The system of claim 5, wherein:
the buffer is configured to regulate a voltage at the common node approximately equal to the reference voltage.

7. A system comprising:
an I-channel mixer configured to receive a radio frequency signal from an antenna and an intermediate frequency signal from a local oscillator;
a Q-channel mixer configured to receive the radio frequency signal from the antenna and a phase-shifted intermediate frequency signal from the local oscillator;
a first noise cancellation apparatus connected to the I-channel mixer, wherein the first noise cancellation apparatus comprises a trans-impedance amplifier stage coupled to an output of the I-channel mixer, a noise reduction stage coupled to the trans-impedance amplifier stage and a feedback loop stage coupled to the noise reduction stage, and wherein the noise reduction stage comprises a first adjustable resistor and a second adjustable resistor connected in series with the first adjustable resistor, and wherein the first adjustable resistor and the second adjustable resistor are configured such that an I-channel differential mode second-order intermodulation component and an I-channel common mode second-order intermodulation component cancel each other in the first noise cancellation apparatus, and wherein a common node of the first adjustable resistor and the second adjustable resistor is directly connected to both an input and an output of a buffer; and
a second noise cancellation apparatus connected to the Q-channel mixer, wherein the second noise cancellation apparatus and the first noise cancellation apparatus have a similar structure.

8. The system of claim 7, wherein:
the first adjustable resistor and the second adjustable resistor are configured such that the first adjustable resistor has a first resistance variation and the second adjustable resistor has a second resistance variation equal to the first resistance variation in an opposite direction.

9. The system of claim 7, wherein:
the second noise cancellation apparatus is configured such that a Q-channel differential mode second-order intermodulation component and a Q-channel common mode second-order intermodulation component cancel each other.

10. The system of claim 7, wherein:
the trans-impedance amplifier stage comprises a common-gate trans-impedance amplifier, and wherein the common-gate trans-impedance amplifier comprises two common gate transistors; and
the feedback loop stage is a common mode feedback loop stage configured to regulate an output voltage of the trans-impedance amplifier stage in response to a reference voltage.

11. The system of claim 10, wherein:
the buffer is coupled between the reference voltage and the common node of the first adjustable resistor and the second adjustable resistor.

12. The system of claim 11, wherein:
the buffer provides a low impedance output; and
the buffer is configured to regulate a voltage at the common node approximately equal to the reference voltage.

13. The system of claim 7, wherein:
the noise reduction stage and the feedback loop stage are connected in parallel between two terminals of the trans-impedance amplifier stage.

14. A system comprising:
an I-channel mixer configured to receive a radio frequency signal from an antenna and an intermediate frequency signal from a local oscillator;
a Q-channel mixer configured to receive the radio frequency signal from the antenna and a phase-shifted intermediate frequency signal from the local oscillator;
a first noise cancellation apparatus having an input directly connected to an output of the I-channel mixer, wherein the first noise cancellation apparatus comprises:
  a first trans-impedance amplifier stage coupled to an output of the I-channel mixer;
  a first noise reduction stage coupled to the first trans-impedance amplifier stage; and
  a first feedback loop stage coupled to the first noise reduction stage, and wherein the first noise reduction stage comprises a first adjustable resistor and a second adjustable resistor connected in series with the first adjustable resistor, and wherein the first adjustable resistor and the second adjustable resistor are configured such that an I-channel differential mode second-order intermodulation component and an I-channel common mode second-order intermodulation component cancel each other, and wherein a common node of the first adjustable resistor and the second adjustable resistor is connected to a reference voltage through a buffer, and wherein an output of the buffer is directly connected to the common node of the first adjustable resistor and the second adjustable resistor; and
a second noise cancellation apparatus having an input directly connected to an output of the Q-channel mixer, wherein the second noise cancellation apparatus comprises:
  a second trans-impedance amplifier stage coupled to an output of the Q-channel mixer;
  a second noise reduction stage coupled to the second trans-impedance amplifier stage; and
  a second feedback loop stage coupled to the second noise reduction stage, and wherein the second noise reduction stage comprises a third adjustable resistor and a fourth adjustable resistor connected in series with the third adjustable resistor, and wherein the third adjustable resistor and the fourth adjustable resistor are configured such that a Q-channel differential mode second-order intermodulation component and a Q-channel common mode second-order intermodulation component cancel each other.

15. The system of claim 14, wherein:
the first adjustable resistor and the second adjustable resistor connected in series and coupled to the output of the I-channel mixer through a first trans-impedance amplifier; and
the third adjustable resistor and the fourth adjustable resistor connected in series and coupled to the output of the Q-channel mixer through the second trans-impedance amplifier stage.

16. The system of claim 14, wherein:
the common node of the first adjustable resistor and the second adjustable resistor is regulated to a reference voltage level through the buffer coupled between the common node and a reference voltage.

17. The system of claim 14, wherein:
the first feedback loop stage comprises:
  a detector circuit coupled to an output of the first trans-impedance amplifier stage; and
  an amplifier configured to regulate a dc output of the first trans-impedance amplifier stage.

18. The system of claim 17, wherein:
a first input of the amplifier is coupled to a reference voltage;
a second input of the amplifier is coupled to the detector circuit; and
an output of the amplifier is coupled to the output of the first trans-impedance amplifier stage through a voltage adjustment apparatus.

19. The system of claim 14, wherein:
the I-channel mixer, the Q-channel mixer, the first noise cancellation apparatus and the second noise cancellation apparatus are in a receiver coupled between the antenna and a baseband processor.

20. The system of claim 19, further comprising:
an I-channel filter, an I-channel gain stage and an I-channel A/D converter connected in cascade between the first noise cancellation apparatus and the baseband processor; and
a Q-channel filter, a Q-channel gain stage and a Q-channel A/D converter connected in cascade between the second noise cancellation apparatus and the baseband processor.

* * * * *